United States Patent [19]

Aughton et al.

[11] Patent Number: 4,758,068
[45] Date of Patent: Jul. 19, 1988

[54] CONTROLLING RADIATION BEAM DIAMETERS

[75] Inventors: John E. Aughton; James H. Gray, both of London, England

[73] Assignee: Crosfield Electronics Limited, London, England

[21] Appl. No.: 5,983

[22] Filed: Jan. 22, 1987

[30] Foreign Application Priority Data

Jan. 31, 1986 [GB] United Kingdom ............... 8602482

[51] Int. Cl.⁴ ........................ G02D 5/30; G02F 1/03
[52] U.S. Cl. ........................... 350/321; 350/387; 372/705
[58] Field of Search .............. 350/573, 96.3, 572, 350/379, 387, 243, 321; 372/9, 108, 109, 700, 701, 702, 703, 704, 705

[56] References Cited

U.S. PATENT DOCUMENTS 3,531,180  9/1970  Fleisher et al. ............ 350/387 X
3,625,585  12/1971  Beiser ........................ 350/573 X
4,312,588  1/1982  Minoura et al. ............. 355/8
4,676,586  6/1987  Jones et al. ............... 350/96.3 X
4,681,396  7/1982  Jones ......................... 350/96.3 X

*Primary Examiner*—Eugene R. LaRoche
*Assistant Examiner*—Nathan W. McCutcheon
*Attorney, Agent, or Firm*—Sughrue, Mion, Zinn, Macpeak and Seas

[57] ABSTRACT

The invention relates to a method and an apparatus for reducing the diameter tolerance of a laser beam. A lens (3) is positioned so that one of the focal planes of the lens (3) is in the region of a limit (5) of the Rayleigh range of the beam (19). The lens (3) forms a second beam waist at a position (6), where a modulator (10) is placed. The beam (21) then passes through beam expansion apparatus (11,12,13) before being collimated by a lens (14). The collimated beam (25) is then focussed to a third beam waist at the recording drum (17), via a lens (18) and mirror (15).

5 Claims, 3 Drawing Sheets

CONTROLLING RADIATION BEAM DIAMETERS

FIELD OF THE INVENTION

This invention relates generally to the field of image processing and controlling the diameters of laser beams.

DESCRIPTION OF THE PRIOR ART

Conventional lasers produce beams with a diameter tolerance which is typically ±15%. In the field of digital image reproduction such as described in our European patent application No. 0095936, a laser beam is controlled in response to digital image information to impinge on a record medium. One of the problems with the wide tolerance in the beam diameter is that with the pixel densities now common in the imaging field, any significant variation in the diameter of the beam will result in some blurring of the resulting image. Another problem with conventional laser beams is that the diameter of the laser beam varies around its cross-section. This results in a beam having an elliptical form which is particularly undesirable when the beam is to be modulated using an acousto-optic modulator. Unless the modulator is particularly accurate, and thus expensive, it will cause the degree of eccentricity to increase.

Beam modulators, such as acousto-optic modulators, can also introduce eccentricity into a previously circular beam.

All the problems outlined above would be reduced if the tolerance in the beam diameter could be reduced. Normally, this would require the careful adjustment of a number of lenses to set an appropriate magnification. This is time consuming and requires a complex setting arrangement.

SUMMARY OF THE INVENTION

In accordance with one aspect of the present invention, a method of reducing the tolerance in the diameter of a beam of coherent radiation comprising the fundamental transverse mode comprises positioning the focal plane of a lens in the region of a limit of the Rayleigh range of the beam.

The invention makes use of the property of beams of coherent radiation comprising, preferably only, the fundamental transverse mode (ie. $TEM_{00}$) that the beam diverges from a position at which the beam has a minimum diameter (hereinafter referred to as a "waist"). By positioning a converging lens downstream of the waist, a second waist will be generated with dimensions having a much smaller tolerance than those of the first waist. The general relationship between the radius ($W_1$) of the first waist, the radius ($W_2$) of the second waist, the focal length (f) of the lens and the distance (Z) from the lens to the first waist is as follows:

$$\frac{1}{W_2^2} = \frac{1}{W_1^2}\left(1 - \frac{Z}{f}\right)^2 + \frac{1}{f^2}\left(\frac{\pi W_1}{\lambda}\right)^2 \quad (1)$$

It can be shown by solving this equation that the change in the radius of the second waist $W_2$ with respect to the first waist $W_1$ is a minimum when $$Z = f \pm \frac{\pi W_1^2}{\lambda} \quad (2)$$

i.e. the focal plane of the lens is at either end of the Rayleigh range.

The Rayleigh range of a radiation beam is defined as the distance from the waist at which the beam diameter has increased by a factor of $\sqrt{2}$. This in fact corresponds to a distance of:

$$\pm \frac{\pi W_1^2}{\lambda}$$

The invention avoids any need for complex lens adjustment and it is not even necessary to know the value of the first waist diameter. As mentioned above, since $W_2$ has turning points when the distance Z is suitably chosen, the value of $W_2$ will be substantially invariant relative to variations in the size of the diameter of the first waist. In fact, for a tolerance of ±15% in the diameter of the first waist, it is possible to achieve a tolerance of about ±2% in the diameter of the second waist.

The beam may comprise a beam of optical radiation and may be accompanied by other, diffracted beams including transverse oscillation modes.

In accordance with a second aspect of the invention, apparatus for generating a beam of coherent radiation comprising only the fundamental transverse mode comprises a radiation beam generator; and a lens positioned such that the focal plane of the lens is in the region of a limit of the Rayleigh range of the beam.

In many cases, the first waist is positioned within the radiation generator such as a laser cavity. In some examples, however, the first waist will be positioned outside the radiation generator.

The lens may be a converging or diverging lens.

The apparatus is particularly suitable in our Crosfield Datrax Imaging system in which a modulator, such as an acousto-optic modulator is positioned at the second waist. This will reduce the extent to which the modulator can increase any ellipticity in the beam. Since the variation in beam diameter at the second waist is very small, and substantially invariant, any eccentricity at the first waist will have been substantially removed from the beam at the second waist.

The invention can also be used to reduce the eccentricity introduced in an otherwise circular beam by modulators such as acousto-optic modulators. In that situation, the modulator will cause the value $W_1$ to vary between two extremes around the cross-section of the beam. This problem can be minimised by utilising the beam at the second waist (e.g. by causing the beam at the second waist to impinge on a record medium) at which variations in $W_2$ around the cross-section will have been minimised.

BRIEF DESCRIPTION OF THE DRAWINGS

Two examples of a method and apparatus according to the invention will now be described with reference to the accompanying drawings, in which.

DETAILED DESCRIPTION OF AN EMBODIMENT

Figure 1:
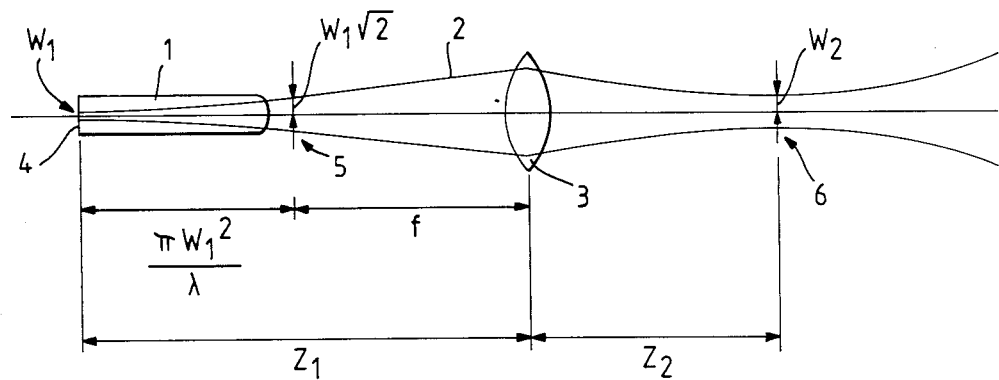
FIG. 1 is a schematic view of one example of the apparatus.

In FIG. 1 a laser 1 generates a coherent beam of optical radiation comprising only the fundamental transverse mode $TEM_{00}$. The beam 2 is guided to a converging lens 3.

As is illustrated diagrammatically in the drawing, the beam 2 diverges from one end 4 of the laser 1 at which it has a minimum radius $W_1$. In other words, the beam has a waist at this position. At a position labelled 5 the radius of the beam has increased to $W_1\sqrt{2}$. This position is at the limit of the Rayleigh range of the beam and the length of the Rayleigh range is given by the formula $\pi W_1^2/\lambda$.

The converging lens 3 causes the beam to converge downstream of the lens to a minimum radius $W_2$ defining a second waist 6. The beam thereafter diverges.

The variation of $W_2$ with $W_1$ is given in equation 1 above. Consider an example in which the system is designed with $f=100$ mm and for $W_1$ to be equal to $W_2$. In that case $W_1$ equals 0.155 mm and $\pi W_1^2/\lambda = 70.7$ mm and therefore $Z_1$ equals 170.7 mm.

Now consider variations in $W_1$. These cause corresponding variations in $W_2$ but to a much smaller extent as set out in the table below.

TABLE

| $W_1$ | $W_2$ | $Z_2$ |
|---|---|---|
| .124 | .148 | 200.3 |
| .139 | .153 | 185.4 |
| .155 | .155 | 170.7 |
| .170 | .153 | 157.4 |
| .186 | .150 | 146.0 |

As can be seen, for a variation in $W_1$ of ±20%, $W_2$ only varies by ±2.4%.

In the table, all magnitudes are in millimeters.

It will be seen that the invention also enables the problem of eccentricity to be reduced. Although the value of $W_1$ may vary around the cross-section of the beam, the corresponding variation in $W_2$ will be much less and thus the actual values of $W_2$ around the cross-section will be very similar.

Figure 2:
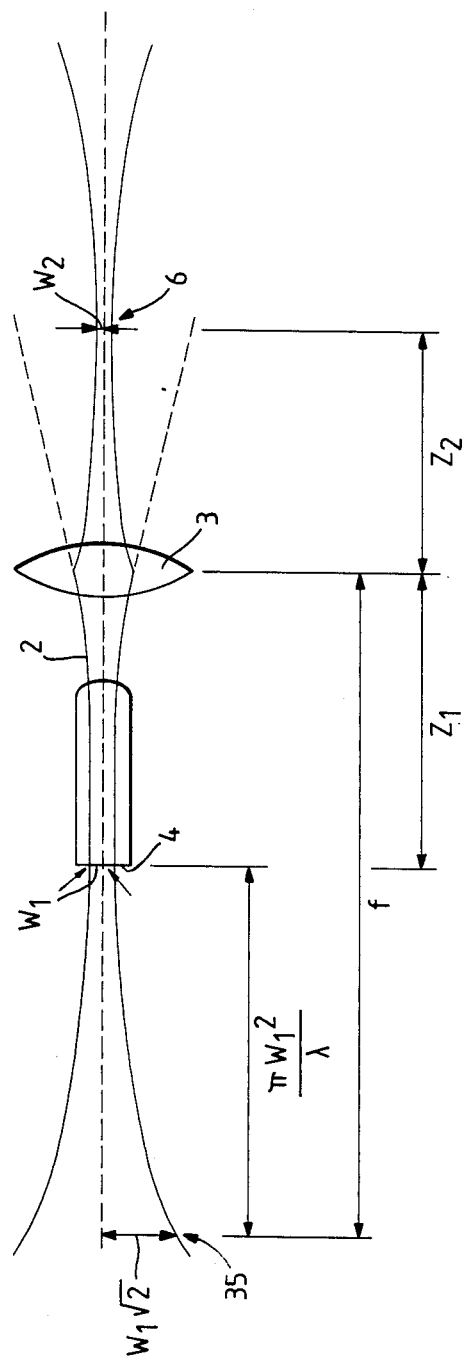
FIG. 2 is a schematic view of a second example of the apparatus.

In FIG. 2 the converging lens 3 has been positioned so that the distance $Z_1$ from the beam waist $W_1$ to the lens is equal to the focal length f of the lens minus the Rayleigh range $\pi W_1^2/\lambda$. In other words, the focal plane of the lens 3 has been placed at the Rayleigh range limit opposite to that of FIG. 1 corresponding to a distance $-\pi W_1^2/\lambda$ from the beam waist $W_1$. This is at position 35. Thus $Z_1 = f - \pi W_1^2/\lambda$.

The performance of the apparatus in this example is identical to the performance of the apparatus in the first example described above.

Figure 3:
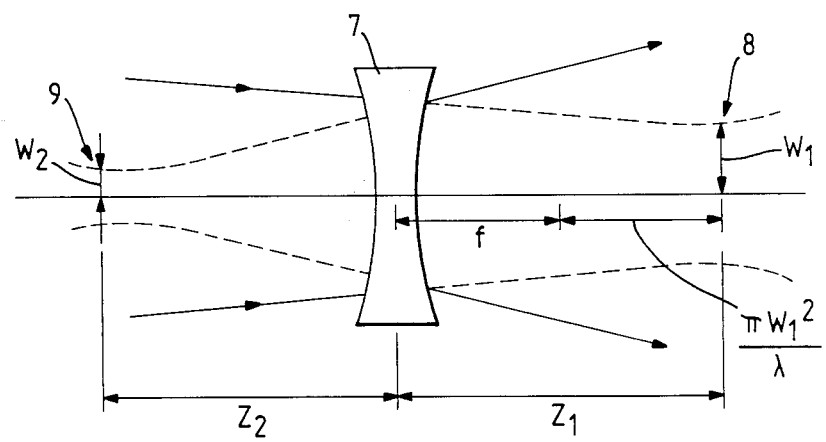
FIG. 3 illustrates part of a third example.

The examples shown in FIGS. 1 and 2 made use of a converging lens 3. The invention is equally applicable for use with a diverging lens and an example of such an arrangement is shown in FIG. 3 although the laser source has been omitted in this drawing. In this example, rays of light from the source impinge on a diverging lens 7 from the left, as seen in the drawing, and, in the absence of the lens 7, would form a waist 8 having a radius $W_1$. The lens 7 causes the rays to diverge from an apparent, virtual beam waist 9 having a radius $W_2$ which is substantially invariant as in the FIG. 1 example.

In a typical example, where f is $-100$ mm, the Rayleigh range is 100 mm, and $W_1$ is 0.184 mm, this will mean that $Z_1$ is 200 mm, $W_2$ is 0.13 mm, and $Z_2$ is $-150$ mm.

Figure 4:
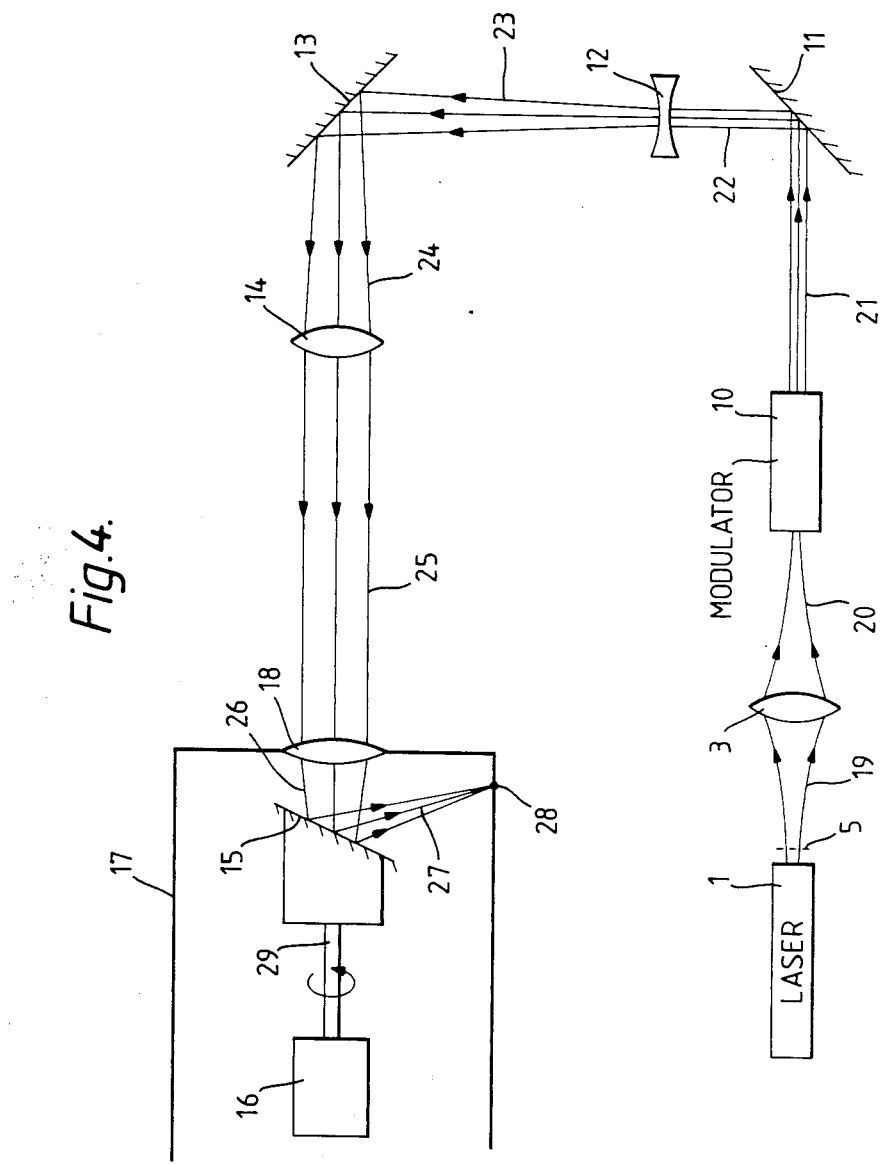
FIG. 4 illustrates how the invention may be used in conjunction with laser scanning apparatus.

The invention can be used in conjunction with laser scanning apparatus, as illustrated in FIG. 4. The lens 3 is placed at a distance, equal to its focal length, from the Rayleigh range limit 5 of the laser beam 19 emitted from the laser 1. The lens 3 produces a converging beam 20 and at the waist 6 of the beam 20, the acousto-optic modulator 10 is placed. Since the variation in beam diameter at the second waist is very small, and substantially invariant with respect to the first waist, any eccentricity at the first waist will have been substantially removed from the beam at the second waist.

The beam 21 exiting from the acousto-optic modulator 10 is then reflected by a plane mirror 11 and passes through a diverging lens 12 which causes beam 23 to diverge, therefore expanding it. The beam 23 is then reflected by a plane mirror 13 and is collimated by a converging lens 14. The collimated laser beam 25 then passes through another converging lens 18 which focusses the beam 27 to a third beam waist at the recording drum 17 at a point 28, after being reflected by a mirror 15 in the centre of the recording drum 17. The mirror 15 is rotated by a shaft 29 attached to a motor 16. This causes the beam 27 to rotate, thereby exposing a section of the recording drum 17. By mounting the mirror 15 and the lens 18 on a lead screw (not shown), they can be made to move axially along the drum 17, thereby exposing the entire surface area of the drum 17. A record medium is positioned on the outer surface of the drum 17 which is transparent. An example of suitable laser scanning apparatus is described in No. EP-A-0095936.

We claim:

1. A method of reducing the tolerance in the diameter of a beam of coherent radiation comprising the fundamental transverse mode and which defines a Rayleigh range, the method comprising positioning a lens such that the focal plane defined by said lens is in the region of a limit of said Rayleigh range of said beam.

2. A method according to claim 1, wherein said beam comprises a beam of optical radiation.

3. Apparatus for generating a beam of coherent radiation comprising said fundamental transverse mode and which defines a Rayleigh range, said apparatus comprising a radiation beam generator; and a lens positioned such that the focal plane defined by said lens is in the region of a limit of said Rayleigh range of said beam.

4. Apparatus according to claim 3, wherein an acousto-optic modulator is situated at a position at which said radiation beam forms a waist.

5. An image recording system including apparatus according to claim 3, wherein a record medium support is positioned such that a record medium is situated at a position at which said radiation beam forms a waist.

* * * * *